United States Patent
Olsson et al.

(10) Patent No.: US 6,751,261 B1
(45) Date of Patent: Jun. 15, 2004

(54) SYNCHRONISATION

(75) Inventors: Lennart Olsson, Lulea (SE); Gunnar Bahlenberg, Lulea (SE); Daniel Bengtsson, Lulea (SE); Siwert Håkansson, Järfälla (SE); Anders Isaksson, Lulea (SE); Lars-Ake Isaksson, Lulea (SE); Mikael Isaksson, Lulea (SE); Magnus Johansson, Lulea (SE); Mauritz Lahti, Lulea (SE); Lis-Marie Ljunggren, Lulea (SE); Hans Lundberg, Lulea (SE); Tomas Nordstrom, Lulea (SE); Sven-Rune Olofsson, Lulea (SE); Tomas Stefansson, Boden (SE); Hans Oman, Lulea (SE); Goran Okvist, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/147,230

(22) PCT Filed: Feb. 27, 1998

(86) PCT No.: PCT/SE98/00353

§ 371 (c)(1),
(2), (4) Date: Feb. 9, 1999

(87) PCT Pub. No.: WO98/39872

PCT Pub. Date: Sep. 11, 1998

(30) Foreign Application Priority Data

Mar. 3, 1997 (SE) .............................. 9700784
Oct. 6, 1997 (SE) .............................. 9703629

(51) Int. Cl.$^7$ .............................................. H04L 5/06
(52) U.S. Cl. ...................................................... 375/260
(58) Field of Search ................................. 375/350, 260, 375/295, 355, 354, 370, 371; 370/208, 503, 509, 516, 518, 520, 519

(56) References Cited

U.S. PATENT DOCUMENTS 5,345,440 A * 9/1994 Gredhill et al. ............... 370/19
5,444,697 A 8/1995 Leung et al.

(List continued on next page.)

FOREIGN PATENT DOCUMENTS

EP 0 730 357 A2 9/1996
WO WO 95/03656 A1 2/1995

Primary Examiner—Mohammad H. Ghayour
Assistant Examiner—Dung X. Nguyen
(74) Attorney, Agent, or Firm—Lisa K. Jorgenson; Allen, Dyer, Doppelt, Milbrath & Gilchrist, P.A.

(57) ABSTRACT

With OFDM systems the frequency domain data is the Fourier transform of the received time domain OFDM frames. The time domain frames must be sampled, at the receiver, in synchronism with the transmitter, so that each received frame contains data from only a single transmitted frame. It is vital for this synchronism to be maintained in order to maintain the orthogonality of the frames. A typical multi-carrier system, of the OFDM type, which uses a cyclic prefix permits orthogonality to be maintained when there is a small deviation from exact frame synchronisation. Because the signalling interval includes both an entire frame and the cyclic prefix, which is a repetition of part of the frame, a frame sampled within the signalling interval will contain data from only one frame. Since the signalling interval is greater than the frame period, this gives some leeway in frame alignment. In a multi-carrier system of the OFDM type, an adaptive channel equalizer, operating in the frequency domain, is often used. The internal parameters in such an equalizer contain, in addition to information about the characteristics of the channel, information which can be interpreted as the time deviation between the sampling clocks of the transmitter and the receiver. The present invention utilizes this information to control the sampling clock of the receiver in a more robust way than has previously been possible with known techniques. The present invention is particularly suitable for use in ADSL and VDSL modems which can be used to give broadband access over copper networks. The invention is also of relevance to broadband transmission in mobile and semi-mobile systems for transmission over the radio channels.

23 Claims, 2 Drawing Sheets

U.S. PATENT DOCUMENTS

| | | | |
|---|---|---|---|
| 5,479,447 A | * 12/1995 | Chow et al. | 375/260 |
| 5,506,836 A | * 4/1996 | Ikeda et al. | 370/19 |
| 5,625,651 A | * 4/1997 | Cioffi | 375/354 |
| 5,726,973 A | * 3/1998 | Isaksson | 370/203 |
| 5,732,113 A | * 3/1998 | Schmidl et al. | 375/355 |
| 5,812,523 A | * 9/1998 | Isaksson et al. | 370/20 |
| 5,909,463 A | * 6/1999 | Johnson et al. | 375/220 |
| 5,953,311 A | * 9/1999 | Davies et al. | 371/210 |
| 6,018,556 A | * 1/2000 | Janesch et al. | 375/376 |
| 6,144,711 A | * 11/2000 | Raleigh et al. | 375/347 |

* cited by examiner

SYNCHRONISATION

The present invention relates to an OFDM transmission system, an OFDM receiver, OFDM modems including ADSL modems and VDSL modems, and methods of synchronising an OFDM receiver with an incoming multi-carrier signal, in particular, the present invention relates to sampling clock oscillator control for an OFDM system.

In this specification the term OFDM (Orthogonal Frequency Division Multiplex) type is intended to include DMT (Discrete Multi-Tone).

The demand for provision of multi-media and other broad bandwidth services over telecommunications networks has created a need to transmit high bit rate traffic over copper pairs. This requirement has led to the development of a number of different transmission schemes, such as, ADSL (Asynchronous Digital Subscriber Line) and VDSL (Very high bit-rate Digital Subscriber Lines). One of the more likely modulation systems for all these transmission schemes is a line code known as DMT (discrete multi-tone), which bears a strong resemblance to orthogonal frequency division multiplex, and is a spread spectrum transmission technique.

In discrete multi-tone transmission, the available bandwidth is divided into a plurality of sub-channels each with a small bandwidth, 4 kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Because inter pair interference in copper pair cables is higher where data is transmitted in both directions, i.e. symmetric duplex, a number of transmission schemes have proposed the use of asymmetric schemes in which high data rates are transmitted in one direction only. Such schemes meet many of the demands for high bandwidth services, such as, video-on-demand.

VDSL technology resembles ADSL to a large degree, although ADSL must cater for much larger dynamic ranges and is considerably more complex as a result. VDSL is lower in cost and lower in power, and premises VDSL units need to implement a physical layer media access control for multiplexing upstream data.

Four line codes have been proposed for VDSL:

CAP; Carrierless AM/PM, a version of suppressed carrier QAM, for passive NT configurations, CAP would use QPSK upstream and a type of TDMA for multiplexing (although CAP does not preclude an FDM approach to upstream multiplexing);

DMT; Discrete Multi-Tone, a multi-carrier system using Discrete Fourier Transforms to create and demodulate individual carriers, for passive NT configurations; DMT would use FDM for upstream multiplexing (although DMT does not preclude a TDMA multiplexing strategy);

DWMT; Discrete Wavelet Multi-Tone, a multi-carrier system using Wavelet Transforms to create and demodulate individual carriers, DWMT also uses FDM for upstream multiplexing, but also allows TDMA; and SLC; Simple Line Code, a version of four-level baseband signalling that filters the base band and restores it at the receiver, for passive NT configurations; SLC would most likely use TDMA for upstream multiplexing, although FDM is possible.

Early versions of VDSL will use frequency division multiplexing to separate downstream from upstream channels and both of them from POTS and ISDN. Echo cancellation may be required for later generation systems featuring symmetric data rates. A rather substantial distance, in frequency, will be maintained between the lowest data channel and POTS to enable very simple and cost effective POTS splitters. Normal practice would locate the downstream channel above the upstream channel. However, the DAVIC specification reverses this order to enable premises distribution of VDSL signals over coaxial cable systems.

In a multi-carrier system, such as a DMT system, a receiver must be able to recover a sampling clock that is very accurately synchronized to a transmitter sampling clock. A known method, for achieving synchronization, uses a reserved carrier, the pilot carrier, which is transmitted with a fixed phase. The receiver sampling clock is then phase locked to the pilot carrier. Frame timing must also be recovered. In existing systems this has been achieved by using a correlation technique operating in the time domain.

With OFDM systems the frequency domain data is the Fourier transform of the received time domain OFDM frames. The time domain frames must be sampled, at the receiver, in synchronism with the transmitter, so that each received frame contains data from only a single transmitted frame. It is vital for this synchronism to be maintained in order to maintain the orthogonality of the frames.

A typical multi-carrier system, of the OFDM type, which uses a cyclic prefix, permits orthogonality to be maintained when there is a small deviation from exact frame synchronisation. Because the signalling interval includes both an entire frame and the cyclic prefix, which is a repetition of part of the frame, a frame sampled within the signalling interval will contain data from only one frame. Since the signalling interval is greater than the frame period, this gives some leeway in frame alignment.

In a multi-carrier system of the OFDM type, the control of the receiver sampling clock is critical for achieving an optimal utilization of the channel capacity. The present invention takes the data needed for this control function from the received signal in a novel manner, in particular, the present invention uses adaptive equalizer parameters for sampling clock oscillator control.

In a multi-carrier system of the OFDM type, an adaptive channel equalizer, operating in the frequency domain, is often used. The internal parameters in such an equalizer contain, in addition to information about the characteristics of the channel, information which can be interpreted as the time deviation between the sampling clocks of the transmitter and the receiver. The present invention utilizes this information to control the sampling clock of the receiver in a more robust way than has previously been possible with known techniques.

Known techniques for achieving frame synchronisation do not operate entirely in the frequency domain. A technique for frame synchronisation in which only frequency domain data is employed, is described in our co-pending patent application Kgp 74/97.

The present invention is particularly suitable for use in ADSL and VDSL modems which can be used to give broadband access over copper networks with relatively stationary channels. The invention is, however, of general application and also of relevance to broadband transmission in mobile and semi-mobile systems for transmission over the radio channels.

The present invention provides an extremely robust estimation of the time deviation between the sampling clocks of the transmitter and the receiver and can handle deviations of several periods, which implies that symbol limits are also guided to the right location. The robustness is achieved by using all active carriers in the estimation.

According to a first aspect of the present invention, there is provided a receiver, for use in an OFDM type transmission system, in which data is transmitted in frames, each frame having a cyclic prefix which is a repetition of part of said frame, characterised in that control means are provided which control a sampling oscillator, and in that said control means include estimation means for estimating timing deviations of said sampling clock, said estimation means operating entirely on frequency domain input data.

According to a second aspect of the present invention, there is provided a receiver, for use in an OFDM type transmission system, in which data is transmitted in frames, each frame having a cyclic prefix which is a repetition of part of said frame, and in which said receiver has an adaptive equaliser having an equaliser inverse channel model, characterised in that separation means are provided for separating said equaliser inverse channel model into a first and a second part, said first part being independent of sample timing and said second part being dependent on sample timing and in that control means are provided which control a sampling oscillator in dependence on said second part.

Said control means may include estimation means for estimating timing deviations of said sampling clock, said estimation means operating entirely on frequency domain input data.

Said estimation means may estimate an approximation of a linear portion of an argument function produced by timing deviations of said sampling oscillator.

Said estimation means may be adapted to find a linear part of said argument function by taking an average slope of said argument function.

Said approximation of a linear portion of an argument function may be used as a feedback control signal for said sampling clock.

Said approximation of a linear portion of an argument function may have a slope which converges to zero as a control loop, for said sampling clock, settles.

Those parts of said equaliser inverse channel model, other than said linear portion of said argument function, may be controlled by said equaliser, which continuously adapts to variations in sampling timing.

Said equaliser and said control means may each use well defined and different portions of said equaliser inverse channel model to achieve an output frequency domain signal with zero phase deviation relative to a transmitted signal.

Said slope of said argument function, as, may be estimated from the equation $$\alpha_k = \frac{1}{N} \sum_n L \frac{X_{n,k}}{n}$$

where N is the number of active carriers and $X_{n,k}$ is the unwrapped argument function for the nth carrier in the kth frame.

Said slope of said argument function, $\alpha_k$, may be estimated from the equation $$\alpha_k = \frac{2}{n_2 - n_0} \left[ \sum_{n=n_1+1}^{n_2} LX_{n,k} - \sum_{n=n_0}^{n_1} LX_{n,k} \right]$$

where N is the number of active carriers, $X_{n,k}$ is the unwrapped argument function for the nth active carrier in the kth frame, indices $n_0$ and $n_2$ are the lower and upper limits respectively of the band and index $n_1$ divides the band into two equal parts.

On start up, frame timing may be adjusted until received frames are sampled inside a signal interval.

Means may be provided, responsive to a feed back control for said sampling oscillator, to adjust said frame timing so that frame synchronization is maintained.

According to a third aspect of the present invention, there is an OFDM type transmission system in which data is transmitted in frames, each frame having a cyclic prefix which is a repetition of part of said frame, characterised in that said system includes a receiver as defined in any preceding paragraph.

According to a fourth aspect of the present invention, there is provided, in an OFDM type system in which data is transmitted in frames, each frame having a cyclic prefix which is a repetition of part of said frame, a method of synchronising a receiver sampling oscillator with a transmitter sampling oscillator, characterised by controlling said sampling oscillator with a feedback signal representing an estimation of timing deviations of said sampling clock, said estimation signal derived directly from domain input data.

According to a fifth aspect of the present invention, there is provided, an OFDM type system in which data is transmitted in frames, each frame having a cyclic prefix which is a repetition of part of said frame, and in which said receiver has an adaptive equaliser having an equaliser inverse channel model, a method of synchronising a receiver sampling oscillator with a transmitter sampling oscillator, characterised by separating said equaliser inverse channel model into a first and a second part, said first part being independent of sample timing and said second part being dependent on sample timing and controlling a sampling oscillator in dependence on said second part.

Timing deviations of said sampling clock may be estimated entirely from frequency domain input data.

An approximation of a linear portion of an argument function produced by timing deviations of said sampling oscillator may be estimated.

A linear part of said argument function may be found by taking an average slope of said argument function.

Said approximation of a linear portion of an argument function may be used as a feedback control signal for said sampling clock.

Said approximation of a linear portion of an argument function may have a slope which converges to zero as a control loop, for said sampling clock, settles.

Those parts of said equaliser inverse channel model, other than said linear portion of said argument function, may be controlled with said equaliser, which continuously adapts to variations in sampling timing.

Said equaliser and said control means may each use well defined and different portions of said equaliser inverse channel model to achieve an output frequency domain signal with zero phase deviation relative to a transmitted signal.

Said slope of said argument function, $\alpha_k$, may be estimated from the equation $$\alpha_k = \frac{1}{N} \sum_n L \frac{X_{n,k}}{n}$$

where N is the number of active carriers and $X_{n,k}$ is the unwrapped argument function for the nth carrier in the kth frame.

Said slope of said argument function, $\alpha_k$, may be estimated from the equation $$\alpha_k = \frac{2}{n_2 - n_0} \left[ \sum_{n=n_1+1}^{n_2} LX_{n,k} - \sum_{n=n_0}^{n_1} LX_{n,k} \right]$$

where N is the number of active carriers, $X_{n,k}$ is the unwrapped argument function for the nth active carrier in the kth frame, indices $n_0$ and $n_2$ are the lower and upper limits respectively of the band and index $n_1$ divides the band into two equal parts.

Frame timing, on start up, may be adjusted until received frames are sampled inside a signal interval.

Said frame timing may be adjusted in accordance with a feed back signal for said sampling oscillator, so that frame synchronization is maintained.

According to a sixth fifth aspect of the present invention, there is provided an ADSL modem characterised in that said modem has a receiver as defined above, or operates a method of synchronisation as defined above.

According to a sixth aspect of the present invention, there is provided a VDSL modem characterised in that said modem has a receiver as defined above, or operates a method of synchronisation as defined above.

Embodiments of the invention will now be described, by way of example, with reference to the accompanying drawings, in which.

Figure 1:
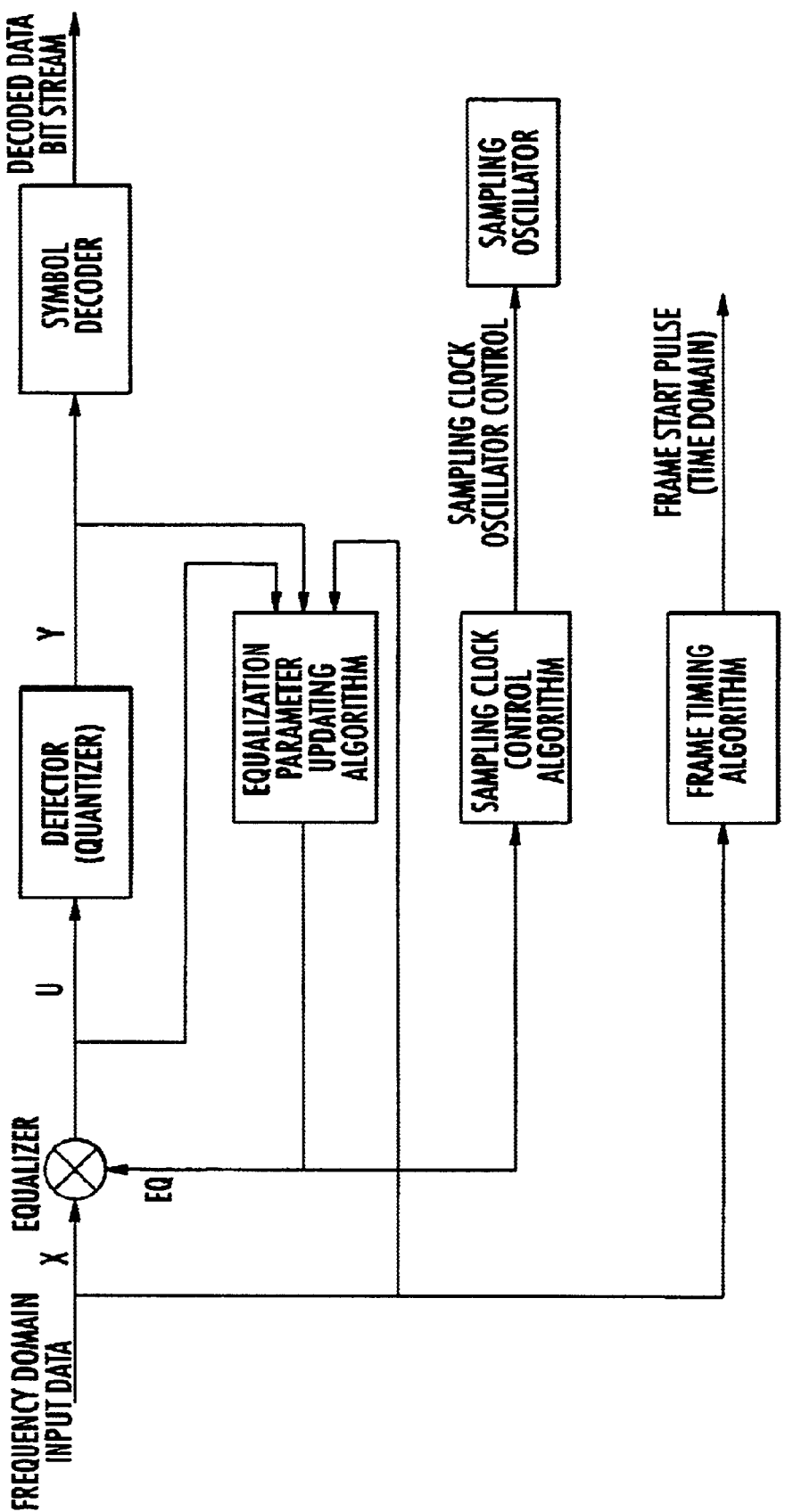
FIG. 1 illustrates, in functional form, an equaliser and sampling control unit in which the present invention can be implemented.

The synchronisation process of the present invention is illustrated in a functional form in FIG. 1. Incoming frequency domain data is passed via an equaliser to a detector/quantizer and thence to a symbol decoder. The operation of the remaining blocks shown in FIG. 1, namely the equalisation parameter updating algorithm, the sampling clock control algorithm and the frame timing algorithm are explained in the following description. It is, however, worth noting at this point that:

the equalisation parameter updating algorithm takes inputs from the raw frequency domain input data, X, the output of the equaliser, U, and the output of the detector/quantizer, Y;

the sampling clock control algorithm receives an input from the equalisation parameter updating algorithm, as does the equaliser; and the frame timing algorithm accepts an input from the raw frequency domain input data.

The frequency-domain data comprises the received time-domain OFDM frames after Fourier transformation. The time-domain frames must be sampled in synchronism with the transmitter so that each received frame contains data from only one transmitted frame. This is important in order to maintain the orthogonality of the frames.

Figure 2:
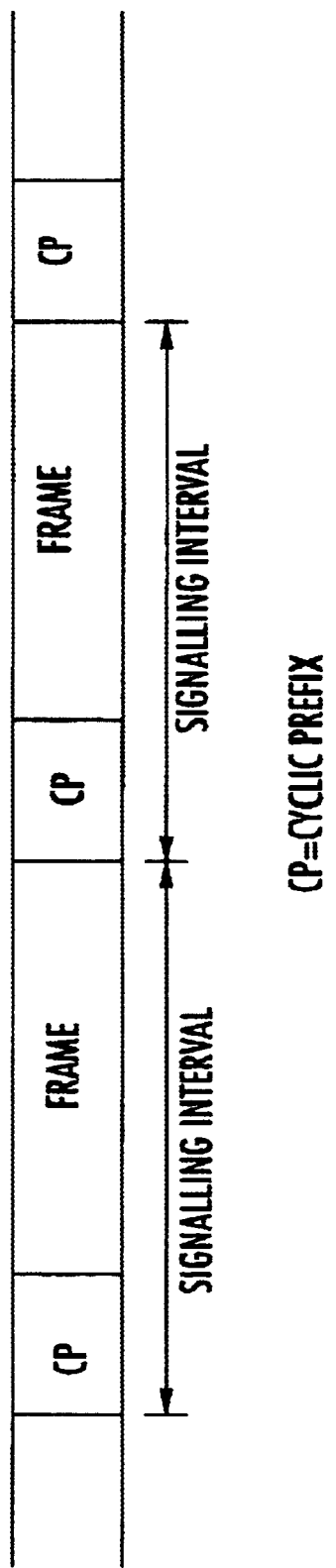
FIG. 2 illustrates the time domain data format of an OFDM signal used with the present invention.

FIG. 2 shows the time-domain format for the transmission of OFDM frames used with the present invention.

The signalling interval contains a cyclic prefix and a frame. The cyclic prefix is a copy of the last part of the frame. This means that a frame sampled anywhere inside the signalling interval will contain data from one transmitted frame only. A deviation from the exact frame timing will, therefore, lead to a cyclic permutation of the frame. The orthogonality will, however, be maintained.

As previously stated, the present invention relates to, among other things, a method for sampling clock oscillator control in a system of the OFDM type, which is based on adaptive equalizer information. The method of the present invention assumes that the linear part of the equalizer parameter argument vector is related to the frame timing deviation. The estimation of the frame timing deviation is performed entirely in the frequency domain and the deviation estimate is used as a feed-back control signal for the sampling clock Oscillator.

A training procedure must be used at start-up. The frame timing is adjusted until the received frames are sampled inside the signalling interval, see our co-pending patent application Kgp 74/97. The sampling clock frequency must also be adjusted so that it is sufficiently close to the transmitter clock frequency to enable the equalizer to follow changes in the timing deviation.

Frame start pulses are generated by counting sampling clock intervals.

Therefore, after the initial setting of the frame start pulse timing during the training procedure, the timing of the frame start pulse will need to be modified by the feed-back control of the sampling clock oscillator, in order to maintain frame synchronisation.

After the training procedure, the equalizer parameters EQ will represent the complex frequency domain inverse of the channel. If there is a deviation from the correct timing of the time domain sampling of the frames, there will also be a linear part of the equalizer inverse channel model argument function. The adaptive equaliser constructs a model of the transmission channel and applies an inverse of this model to incoming signals—the equaliser inverse channel model.

The exact linear argument function, produced by the timing deviation, is not available, but an approximation can be estimated using the equalizer parameters. The argument function of the equalizer parameters is generally non-linear, but a linear part can be found by taking the average slope of the argument function. This slope estimate is used as a feed-back signal to control the sampling clock oscillator frequency. The slope will converge towards zero as the sampling clock control loop settles.

The rest of the equaliser inverse channel model is taken care of by the equalizer, which continuously adapts to variations in the sample timing.

The advantage of this technique is that the equalizer and the sampling control use well defined separate parts of the equaliser inverse channel model to achieve an output frequency domain signal with zero phase deviation relative to the transmitted signal.

The argument function of the equalizer parameters is the vector of arguments of the individual complex elements. The argument of a complex number is the inverse tangent of the imaginary part divided by the real part. A problem associated with this calculation is that the inverse tangent function is periodic, with a period $2\pi$ radians. In this application it is necessary to handle larger arguments than $\pi$ radians, which is the range of the inverse tangent function. An assumption used here is that the difference in argument between adjacent parameters is smaller than n radians. This means that it is possible to compensate for each discontinuity caused by the inverse tangent function periodicity and thus unwrap the argument function.

The average slope, $\alpha_k$, of the linear part of the argument function can be calculated, as shown in equation (1), or by some other standard method, using the unwrapped argument function of $X_k$ for the kth frame $$\alpha_k = \frac{1}{N} \sum_n L \frac{X_{n,k}}{n} \quad (1)$$

where N is the number of active carriers and $X_{n,k}$ is the unwrapped argument function for the nth carrier in the kth frame.

If the lowest frequency carriers are not present in the frame, it is not possible to find the true argument function, because there will be an unknown starting value for the available part of the function. This is not a problem in the present case, since the slope can still be calculated.

Equation (2) shows an algorithm that gives the average slope of a contiguous band of active carriers. Indices $n_0$ and $n_2$ are the lower and upper limits respectively of the band. Index $n_1$ divides the band into two equal parts. If several separate bands are used, equation (2) is applied to each band and the average of the results is calculated.

$$\alpha_k = \frac{2}{n_2 - n_0} \left[ \sum_{n=n_1+1}^{n_2} LX_{n,k} - \sum_{n=n_0}^{n_1} LX_{n,k} \right]$$

The algorithm, according to equation (2), gives a very simple hardware implementation for OFDM receivers.

The unique novelty in the technique of the present invention resides in the separation of the inverse channel model into two parts, one of which is sample timing dependent and the other of which is sample timing independent.

If the sample timing and the equalizer are controlled by separate techniques they might counteract each others actions, because, both the equalizer and the sample timing influence time delay. This situation could eventually lead to a drift of the frame timing out of the correct interval (the cyclically permuted signal interval). This cannot happen with the technique of the present invention.

The sample timing control, provided by the present invention, is very robust against external disturbance, because every active carrier is used in the timing deviation estimation.

What is claimed is:

1. A receiver, for use in an OFDM transmission system in which data is transmitted in frames, each frame having a cyclic prefix which is a repetition of part of the frame, the receiver comprising:
   a sampling oscillator;
   an adaptive equalizer having an equalizer inverse channel model;
   separation means for separating the equalizer inverse channel model into a first and a second part, the first part being independent of sample timing and the second part being dependent on sample timing; and
   control means for controlling the sampling oscillator based upon the second part.

2. A receiver according to claim 1 wherein said control means comprises estimation means for estimating timing deviations of said sampling oscillator; and wherein said estimation means operates entirely on frequency domain input data.

3. A receiver according to claim 2 wherein said estimation means estimate an approximation of a linear portion of an argument function produced by timing deviations of said sampling oscillator.

4. A receiver according to claim 2 wherein said estimation means finds the linear portion of the argument function by taking an average slope of the argument function.

5. A receiver according to claim 4 wherein the approximation of the linear portion of the argument function is used as a feedback control signal for said sampling oscillator.

6. A receiver according to claim 5 further comprising a control loop for said sampling oscillator; and wherein the approximation of the linear portion of the argument function has a slope which converges to zero as the control loop settles.

7. A receiver according to claim 6 wherein parts of the equalizer inverse channel model, other than the linear portion of the argument function, are controlled by said adaptive equalizer which continuously adapts to variations in sampling timing.

8. A receiver according to claim 7 wherein said adaptive equalizer and said control means each use defined and different portions of the equalizer inverse channel model to achieve an output frequency domain signal with zero phase deviation relative to a transmitted signal.

9. A receiver according to claim 6 wherein the slope of the argument function $\alpha_k$ is estimated from an equation $$\alpha_k = \frac{1}{N} \sum_n L \frac{X_{n,k}}{n}$$

where N is the number of active carriers and $X_{n,k}$ is the unwrapped argument function for an nth active carrier in a kth frame.

10. A receiver according to claim 6 wherein the slope of the argument function $\alpha_k$ is estimated from an equation $$\alpha_k = \frac{2}{n_2 - n_0} \left[ \sum_{n=n_1+1}^{n_2} LX_{n,k} - \sum_{n=n_0}^{n_1} LX_{n,k} \right]$$

where N is the number of active Carriers, $X_{n,k}$ is the unwrapped argument function for an nth active carrier in a kth frame, indices $n_0$ and $n_2$ are lower and upper limits respectively of a band and index $n_1$ which divides the band into two equal parts.

11. An OFDM transmission system in which data is transmitted in frames, each frame having a cyclic prefix which is a repetition of part of the frame, the OFDM transmission system comprising:
   a receiver comprising
      a sampling oscillator,
      an adaptive equalizer having an equalizer inverse channel model,
      a separation circuit for separating the equalizer inverse channel model into a first and a second part, the first part being .independent of sample timing and the second part being dependent on sample timing, and
      a controller for controlling the sampling oscillator in dependence on the second part.

12. In an OFDM system in which data is transmitted in frames, each frame having a cyclic prefix which is a repetition of part of the frame, and in which the receiver comprises an adaptive equalizer having an equalizer inverse channel model, a method of synchronizing a receiver sampling oscillator with a transmitter sampling oscillator, the method comprising:
   separating the equalizer inverse channel model into a first and a second part, the first part being independent of sample timing and the second part being dependent on sample timing; and
   controlling a sampling oscillator based upon the second part.

13. A method according to claim 12 further comprising estimating timing deviations of the receiver sampling oscillator entirely from frequency domain input data.

14. A method according to claim 13 wherein estimating comprises estimating an approximation of a linear portion of an argument function produced by timing deviations of the receiver sampling oscillator.

15. A method according to claim 14 wherein estimating an approximation of a linear portion of an argument function comprises taking an average slope of the argument function.

16. A method according to claim 14 further comprising using the approximation of a linear portion of an argument function as a feedback control signal for the receiver sampling oscillator.

17. A method according to claim 16 wherein the approximation of a linear portion of an argument function has a slope which converges to zero as a control loop for the receiver sampling oscillator settles.

18. A method according to claim 17 further comprising controlling parts of the equalizer inverse channel model, other than the linear portion of the argument function, with the adaptive equalizer which continuously adapts to variations in sampling timing.

19. A method according to claim 18 wherein the adaptive equalizer and the control loop each use defined and different portions of the equalizer inverse channel model to achieve an output frequency domain signal with zero phase deviation relative to a transmitted signal.

20. A method according to claim 17 wherein estimating the slope of the argument $\alpha_k$ uses an $$\alpha_k = \frac{1}{N} \sum_n L \frac{X_{n,k}}{n}$$

where N is the number of active carriers and $X_{n,k}$ is the unwrapped argument function for an nth active carrier in a kth frame.

21. A method according to claim 17 wherein estimating the slope of the argument function $\alpha_k$ uses an equation $$\alpha_k = \frac{2}{n_2 - n_0} \left[ \sum_{n=n_1+1}^{n_2} LX_{n,k} - \sum_{n=n_0}^{n_1} LX_{n,k} \right]$$

where N is the number of active carriers, $X_{n,k}$ is the unwrapped argument function for an nth active carrier in a kth frame, indices $n_0$ and $n_2$ are lower and upper limits respectively of a band and index $n_1$ which divides the band into two equal parts.

22. A method according to claim 21 further comprising adjusting frame timing, upon starting, until received frames are sampled within a signal interval.

23. A method according to claim 22 wherein adjusting the frame timing comprises adjusting the frame timing in accordance with a feed back signal so that the sampling oscillator maintains frame synchronization.

* * * * *

UNITED STATES PATENT AND TRADEMARK OFFICE
CERTIFICATE OF CORRECTION

PATENT NO. : 6,751,261 B1
DATED : June 15, 2004
INVENTOR(S) : Olsson et al.

It is certified that error appears in the above-identified patent and that said Letters Patent is hereby corrected as shown below:

Column 8,
Line 36, delete "Carriers" insert -- carriers --
Line 51, delete ".independent" insert -- independent --

Column 9,
Line 30, delete "uses an" insert -- uses an equation --

Signed and Sealed this

Fourteenth Day of September, 2004

JON W. DUDAS
*Director of the United States Patent and Trademark Office*